US012541118B2

(12) United States Patent
Le Saux et al.

(10) Patent No.: US 12,541,118 B2
(45) Date of Patent: Feb. 3, 2026

(54) ACTIVE LENS ADAPTED FOR CORRECTING AN ABNORMAL REFRACTION OF AN EYE OF A WEARER

(71) Applicant: Essilor International, Charenton-le-pont (FR)

(72) Inventors: Gilles Le Saux, Charenton-le-pont (FR); Estelle Netter, Charenton-le-pont (FR); Mathieu Feuillade, Charenton-le-pont (FR); Matthieu Guillot, Charenton-le-pont (FR)

(73) Assignee: Essilor International, Charenton-le-pont (FR)

( * ) Notice: Subject to any disclaimer, the term of this patent is extended or adjusted under 35 U.S.C. 154(b) by 956 days.

(21) Appl. No.: 17/615,710

(22) PCT Filed: Jun. 5, 2020

(86) PCT No.: PCT/EP2020/065650
§ 371 (c)(1),
(2) Date: Dec. 1, 2021

(87) PCT Pub. No.: WO2020/245375
PCT Pub. Date: Dec. 10, 2020

(65) Prior Publication Data
US 2022/0236589 A1     Jul. 28, 2022

(30) Foreign Application Priority Data
Jun. 5, 2019  (EP) ...................................... 19305728

(51) Int. Cl.
*G02C 7/02*    (2006.01)
*G02C 7/08*    (2006.01)

(52) U.S. Cl.
CPC ............. *G02C 7/022* (2013.01); *G02C 7/083* (2013.01); *G02C 7/085* (2013.01); *G02C 2202/12* (2013.01); *G02C 2202/24* (2013.01)

(58) Field of Classification Search
CPC ........ G02C 7/022; G02C 7/083; G02C 7/085; G02C 7/021; G02C 7/08; G02C 7/081;
(Continued)

(56) References Cited

U.S. PATENT DOCUMENTS

| 7,517,083 B2 | 4/2009 | Blum et al. |
| 2005/0185135 A1* | 8/2005 | Blum ................ G02F 1/133553 330/295 |

(Continued)

FOREIGN PATENT DOCUMENTS

| CN | 107529340 A | 12/2017 |
| EP | 1 411 382 A2 | 4/2004 |

(Continued)

OTHER PUBLICATIONS

International Search Report and Written Opinion issued on Nov. 2, 2020 in PCT/EP2020/065650 filed Jun. 5, 2020, 12 pages.

*Primary Examiner* — Travis S Fissel
(74) *Attorney, Agent, or Firm* — Oblon, McClelland, Maier & Neustadt, L.L.P.

(57) ABSTRACT

An ophthalmic lens intended to be worn in front of an eye of a wearer having a first optical function based on a prescription of the wearer for correcting an abnormal refraction of said eye of the wearer and comprising at least one activable optical element, wherein in a first state the at least one activable optical element contributes with the rest of the lens to focus the image of an object at distance on the retina, and in a second state the at least one activable optical element has a second optical function of not focusing an
(Continued)

image on the retina of the eye of the wearer so as to slow down the progression of the abnormal refraction of the eye.

17 Claims, 3 Drawing Sheets

(58) Field of Classification Search
CPC ............ G02C 2202/12; G02C 2202/24; A61F 2/1624; A61F 2/1627; A61F 2/1648
USPC ...................................................... 351/159.4
See application file for complete search history.

(56) References Cited

U.S. PATENT DOCUMENTS

| | | | |
|---|---|---|---|
| 2008/0106633 A1* | 5/2008 | Blum | G02C 7/08 348/335 |
| 2014/0036172 A1* | 2/2014 | Trajkovska-Broach | G02C 7/083 349/13 |
| 2015/0077660 A1 | 3/2015 | Pugh et al. | |
| 2017/0276963 A1* | 9/2017 | Brennan | G02C 7/081 |
| 2020/0103677 A1 | 4/2020 | Drobe | |

FOREIGN PATENT DOCUMENTS

| | | |
|---|---|---|
| EP | 2 848 986 A2 | 3/2015 |
| EP | 3 079 006 A1 | 10/2016 |
| EP | 3 223 066 A1 | 9/2017 |
| EP | 3 140 177 A1 | 12/2018 |
| JP | 11-352445 A | 12/1999 |
| JP | 2017-173847 A | 9/2017 |
| WO | WO 2006/011937 A2 | 2/2006 |
| WO | WO 2007/092853 A2 | 8/2007 |
| WO | WO 2011/119601 A1 | 9/2011 |
| WO | WO 2011/153112 A2 | 12/2011 |
| WO | WO 2014/004839 A1 | 1/2014 |
| WO | WO 2016/070243 A1 | 5/2016 |
| WO | 2018-500609 A | 1/2018 |
| WO | WO 2018/041866 A1 | 3/2018 |

* cited by examiner

ACTIVE LENS ADAPTED FOR CORRECTING AN ABNORMAL REFRACTION OF AN EYE OF A WEARER

FIELD OF THE INVENTION

The invention relates to a lens adapted for correcting an abnormal refraction of an eye of a wearer, and more precisely to an active lens having a first optical function based on a prescription of the wearer for correcting an abnormal refraction of said eye of the wearer and a second activable optical function for focusing an image other than on the retina of the eye of the wearer so as to prevent or at least slow down the progression of the abnormal refraction of the eye

BACKGROUND OF THE INVENTION

Myopia of an eye is characterized by the fact that the eye focuses distant objects in front of its retina, hypermetropia is characterized by the fact that the eye focuses distant objects behind of its retina. Myopia is usually corrected using a concave lens providing negative dioptric power and hypermetropia is usually corrected using a convex lens providing positive dioptric power.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time partly caused by long and intensive near work sessions.

In particular, studies carried out on monkeys have shown that strong defocusing of the light behind the retina, which occurs away from the foveal zone, may cause the eye to extend and therefore may cause a myopia defect to increase.

Management of the evolution of the abnormal refraction of an eye is generally done via passive optical lenses comprising optical elements placed on one of its surfaces to prevent, or at least slow down, the progression of abnormal refractions of an eye such as myopia or hyperopia.

Although the use of passive optical lenses comprising optical elements has provided good results in preventing and slowing down the progression of an abnormal refraction of an eye, the utilization of such lenses may have some drawback.

Indeed, the optical elements placed on the surface of the ophthalmic lens may generate a multiplicity of blur images that may superpose on the retina with the sharp image generated by the ophthalmic lens. Such superposition of sharp and blur images may reduce the optical performances of the wearer and/or its comfort. Additionally, optical elements on the surface of the ophthalmic lens may reduce the field of view, induce a loss of contrast sensitivity, and induce distortions that could lead to headaches.

Furthermore, passive optical lenses comprising optical elements do not allow to adjust the amount of abnormal refraction progression control, nor to deactivate the abnormal refraction progression control functionality when it is not needed.

Therefore, there is a need to provide a ophthalmic lens for correcting an abnormal refraction of an eye of a wearer while controlling the function that prevent or at least slow down the abnormal refraction progression of said eye of the wearer.

SUMMARY OF THE INVENTION

To this end, the invention proposes an ophthalmic lens intended to be worn in front of an eye of a wearer having a first optical function based on a prescription of the wearer for correcting an abnormal refraction of said eye of the wearer and comprising at least one activable optical element, wherein in a first state the at least one activable optical element contributes with the rest of the lens to focus the image of an object at distance on the retina, and in a second state the at least one activable optical element has a second optical function of not focusing an image on the retina of the eye of the wearer, for example, by focusing an image other than on the retina of the eye of the wearer, so as to slow down the progression of the abnormal refraction of the eye.

Advantageously, having an ophthalmic lens comprising a controllable optical function of not focusing an image on the retina of the eye of the wearer, for example, by focusing an image other than on the retina of the eye of the wearer allows to easily adjust the balance between preventing or slowing down an abnormal refraction of an eye of a wearer and the loss of visual comfort or performances of said user.

In other words, the ophthalmic lens of the invention allows to manage the optical function that allows to optimally prevent or slow down an abnormal refraction of an eye of a wearer so as to limit the negative impact of said function on the visual comfort and performances of said wearer.

According to further embodiments which can be considered alone or in combination:
- in the second state the at least one activable optical element has a second optical function of focusing an image other than on the retina of the eye of the wearer; and/or
- the abnormal refraction of the eye of the wearer corresponds to myopia and the activable optical element focuses light rays in front of the retina of the user; and/or
- the abnormal refraction of the eye of the wearer corresponds to hypermetropia and the activable optical element focuses light rays behind the retina of the user; and/or
- the second optical function is supported by a plurality of at least three activable optical elements; and/or
- at least one of the activable optical elements has a spherical surfacic power; and/or
- at least one of the activable optical elements has an aspherical surfacic power; and/or
- the activable optical elements are organized on concentric rings on at least one surface of the substrate of the ophthalmic lens; and/or
- the mean optical power of the activable optical elements is uniform among at least one concentric ring of the activable optical elements; and/or
- the mean optical power of at least part of the activable optical elements varies from the center to the edge of the ophthalmic lens; and/or
- the mean optical power of at least part of the activable optical elements decreases from the center to the edge of the ophthalmic lens; and/or the mean optical power of at least part of the activable optical elements increases from the center to the edge of the ophthalmic lens; and/or the mean sphere and/or the mean cylinder of at least part of the optical elements increases from a first point of a section of the lens towards the peripheral part of said section and decreases from a second point of said section towards the peripheral part of said section, the second point being closer to the peripheral part of said section than the first point; and/or at least part of the activable optical elements are contiguous; and/or the ophthalmic lens further comprises a first substrate having a first index of refraction, a second substrate having said first index of refraction, the second substrate being arranged to face the first substrate and form a cavity between said first and second substrates, an electro-active material disposed between the first and second substrates, the electro-active material having an index of refraction equal to the index of refraction of the substrates in a first state, a first conductive layer disposed on the surface of the first substrate facing the electro-active material, a second conductive layer disposed on the surface of the second substrate facing the electro-active material, wherein at least one of the surface of the substrate facing the electro-active material comprises at least one activable optical element, and wherein in a first state, the first and second substrates, the electro-active material and the at least one activable optical element have the same index of refraction and participate to the first optical function, and in a second state, the index of refraction of the electro-active material is modified, thereby activating the second optical function of the at least one activable optical element; and/or the electro-active material is a liquid crystal; and/or the at least one activable optical element comprises a thermo-optical material whose index of refraction varies with temperature; and/or the index of refraction of the thermo-optical material varies with temperature at a rate greater than or equal to $10^{-3}/°$ C.; and/or the ophthalmic lens further comprises at least one electrode arranged so as to modify the temperature of the thermo-optical material; and/or the at least one electrode is made of an electrically conductive material having a level of transmission higher than 80%, preferably higher than 90%, and more preferably higher than 95%; and/or the electrically conductive material corresponds to ITO and/or PEDOT and/or ATO and/or AZO; and/or the thickness of the thermo-optical element is greater than or equal to 5 µm; and/or the thickness of the thermo-optical element is smaller than or equal to 500 µm; and/or the ophthalmic lens further comprises a first substrate having a first index of refraction, a second substrate having said first index of refraction, the second substrate being arranged to face the first substrate and form a cavity between said first and second substrates, a first liquid disposed between the first and second substrate, the first liquid having a first index of refraction equal to the index of refraction of the first and second substrates, an activable pump disposed between the two substrates, wherein at least one of the surface of the substrate facing the first liquid comprises at least one activable optical element, and wherein in a first state, the first and second substrates, the first liquid and the at least one activable optical element have the same index of refraction and participate to the first optical function, and in a second state, the activable pump switches the first liquid to a second liquid having a second index of refraction that differs from the index of refraction of the first and second substrates, thereby activating the second optical function of the at least one activable optical element; and/or the ophthalmic lens further comprises a first substrate having a first index of refraction, a second substrate having said first index of refraction, the second substrate being arranged to face the first substrate and form a cavity between said first and second substrates, a ultrathin deformable membrane disposed between the first and second substrates and comprising at least one activable optical element, a first liquid disposed between the first substrate and the ultrathin deformable membrane, the first liquid having a first index of refraction, a second liquid disposed between the second substrate and the ultrathin deformable membrane, the second liquid having a second index of refraction different from the first index of refraction; and an activable pump disposed between the first and second substrates, wherein in a first state the at least one activable optical element has the same curvature of the front side of the ophthalmic lens, and wherein in a second state the activable pump modifies the pressure of the second liquid to deform the ultrathin membrane and modify the curvature of the at least one activable optical element, thereby activating the second optical function of said activable optical element; and/or the ophthalmic lens further comprises a first substrate having a first index of refraction, a second substrate having said first index of refraction, the second substrate being arranged to face the first substrate and form a cavity between said first and second substrates, a first dielectric liquid disposed between the first and the second substrates, the first liquid having a first index of refraction, a second dielectric liquid, non-miscible with the first dielectric liquid, disposed between the first and the second substrates, the second liquid having a second refractive index of refraction different from the first refractive index and a dielectric constant lower than the dielectrics constant of the first liquid, at least one conductive layer disposed on the surface of at least one of the first and second substrates facing the second dielectric liquid forming a droplet, the first dielectric forming the surrounding, wherein in a first state the at least one conductive layer generates an electric field that shapes the second dielectric liquid into a droplet having the same curvature as the front surface of the ophthalmic lens, and in a second state the at least one conductive layer creates an inhomogeneous electric field generating a dielectric force forcing the second dielectric liquid that shrinks towards the region having a weaker electric field to form the at least one activable optical element having a surfacic curvature that differs from the surfacic curvature of the ophthalmic lens; and/or the ophthalmic lens further comprises a substrate having a first index of refraction, at least one holographic optical element disposed on the face of the substrate facing the eye of the user, and at least one activable image source, wherein in a first state, the substrate and the at least one holographic optical element have the same index of refraction and participate to the first optical function, and in a second state, the at least one image source generates light that is reflected on the at least one holographic optical element toward the eye of the user thereby activating the second optical function of the at least one activable optical element; and/or the ophthalmic lens further comprises a varnish element disposed on at least one of its surfaces; and/or the ophthalmic lens further comprises receiving means configured to receive data, and the transitions between the first and second states of the ophthalmic lens are driven in real-time based on the received data;

the received data are activity data relating to an activity carried on by the wearer; and/or the received data relates to a viewing distance; and/or the received data relates to a viewing angle; and/or the received data relates to environment data.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION OF EMBODIMENTS OF THE INVENTION

The invention relates to an ophthalmic lens intended to be worn in front of an eye of a wearer having a first optical function based on the prescription of the wearer for correcting an abnormal refraction of said eye of the wearer and comprising at least one activable optical element, for example, a plurality of at least three activable optical elements.

In a first state, the at least one activable optical element contributes with the rest of the lens to focus the image of an object at distance on the retina. In a second state the at least one activable optical element has a second optical function of not focusing an image on the retina of the eye of the wearer so as to slow down the progression of the abnormal refraction of the eye of said wearer.

According to an embodiment of the disclosure, in the second state, the at least one activable optical element have a second optical function of focusing an image of a distant object other than on the retina of the eye of the wearer so as to slow down the progression of the abnormal refraction of the eye of said wearer. This particular embodiment will apply to any embodiment covered by the invention and in particular to any embodiments described in relation with FIGS. 1 to 7.

Figure 1:
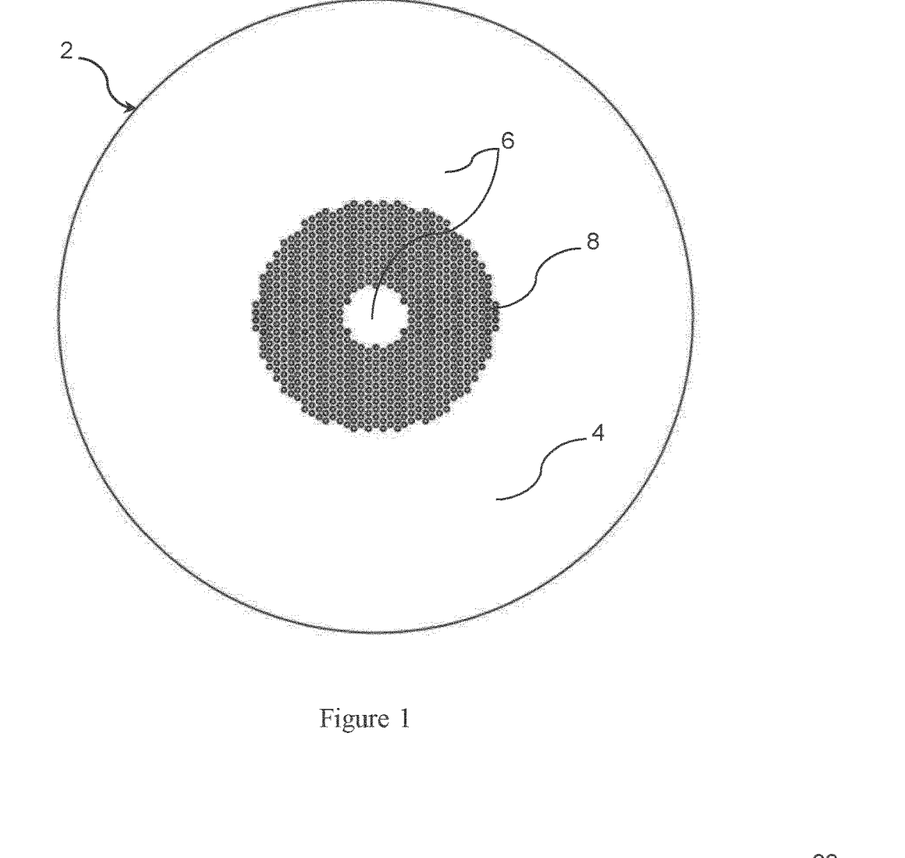
FIG. 1 illustrates a plan view of a ophthalmic lens according to an embodiment of the invention, FIG. 2 illustrate an ophthalmic lens according to an embodiment of the invention, FIGS. 3A and 3B respectively illustrates an ophthalmic lens in a first state and in a second state according to an embodiment of the invention, FIGS. 4A and 4B respectively illustrates an ophthalmic lens in a first state and in a second state according to an embodiment of the invention, FIGS. 5A and 5B respectively illustrates an ophthalmic lens in a first state and in a second state according to an embodiment of the invention, FIGS. 6A and 6B respectively illustrates an ophthalmic lens in a first state and in a second state according to an embodiment of the invention.

As illustrated on FIG. 1, the ophthalmic lens 2 according to the invention comprises a holder 4 having a refractive area 6 and a plurality of activable optical elements 8.

The holder 4 may be a single substrate made for example of a polycarbonate material. Alternatively, the holder 4 may be made of multiple substrates, preferentially two, arranged to face each other so as to form the ophthalmic lens.

The holder 4 has a refractive area 6 having a first optical function of focusing an image of a distant object on the retina of the eye of the wearer of the ophthalmic lens.

The first optical function is based on the prescription of the eye of the wearer for which the ophthalmic lens is adapted. The prescription is adapted for correcting the abnormal refraction of the eye of the wearer.

The term "prescription" is to be understood to mean a set of optical characteristics of optical power, of astigmatism, of prismatic deviation, determined by an ophthalmologist or optometrist in order to correct the vision defects of the eye, for example, by means of a lens positioned in front of his eye. For example, the prescription for a myopic eye comprises the values of optical power and of astigmatism with an axis for the distance vision.

For example, the shape of a refraction area 6 is spherical. The shape of the other face of the ophthalmic lens is configured so that the refraction area has a first optical function of focusing an image on the retina.

For example the shape of said second face is spherotorical. Advantageously, the shape of the ophthalmic lens of said second face is aspherical and calculated by an optical optimization such that every light beam incident on the refraction area 6 is focused on the retina of the wearer when the lens is worn.

According to different embodiments of the invention, the abnormal refraction of the eye is myopia, hyperopia or astigmatism.

The ophthalmic lens 2 according to the invention further comprises at least one activable optical element 8. Preferably, the ophthalmic lens 2 comprises a plurality of at least three activable optical elements 8.

The at least one activable optical element 8 may vary between multiple states, preferentially two states, having different optical functions. The activation of the at least one activable optical element 8 changes the state of said activable optical element.

In a first state, the at least one activable optical element 8 has an optical function of focusing an image of a distant object on the retina of the eye of the wearer. In other words, the at least one activable optical element 8 contributes with the refracting area 6 of the ophthalmic lens to the first optical function.

The at least one activable optical element 8 may switch to a second state having a second optical function of not focusing an image of a distant object on the retina of the eye of the wearer.

According to an embodiment of the disclosure, in the second state, the at least one activable optical element 8 may switch to a second state having a second optical function of focusing an image of a distant object other than on the retina of the eye of the wearer.

When the abnormal refraction of the eye of the wearer corresponds to myopia, in one embodiment the at least one activable optical element 8 has an optical function of focusing an image in front of the retina of the eye of the wearer.

When the abnormal refraction of the eye of the wearer corresponds to hypermetropia the at least one activable optical element 8 has an optical function of focusing an image behind the retina of the eye of the wearer.

The at least one activable optical element 8 is smaller than the pupil of the eye of the wearer.

Advantageously, at the emplacement of the at least one activable optical element 8, an image of a distant object is simultaneously focus on the retina and other than on the retina of the wearer of the ophthalmic lens allowing to simultaneously perfectly see the object and prevent or slow down the abnormal refraction of the eye of the wearer.

According to an embodiment of the invention, the at least one activable optical element 8 in the second state is configured to not focus an image of a distant object on the retina of the eye of the wearer and in a particular embodiment to focus transmitted light rays other than on the retina of the eye of the wearer.

The second optical function may be supported by a plurality of at least three activable optical elements. For example, at least one of the activable optical elements has a spherical surfacic power and/or at least one of the activable optical elements has an aspherical surfacic power.

The activable optical elements may be organized on concentric rings on the ophthalmic lens, for example on at least one surface of a substrate of the ophthalmic lens.

Having the activable optical elements organized in concentric rings on the ophthalmic lens improves the aesthetic of the lens and improve the comfort of the wearer.

The mean optical power of the activable optical elements may be uniform among at least one concentric ring of the activable optical elements.

The mean optical power of at least part of the activable optical elements may vary from the center to the edge of the ophthalmic lens.

The mean optical power of at least part of the activable optical elements may decrease from the center to the edge of the ophthalmic lens. Additionally, the mean optical power of at least part of the activable optical elements may increase from the center to the edge of the ophthalmic lens.

The mean sphere and/or the mean cylinder of at least part of the optical elements may increase from a first point of a section of the lens towards the peripheral part of said section and decreases from a second point of said section towards the peripheral part of said section, the second point being closer to the peripheral part of said section than the first point.

At least part of the activable optical elements may be contiguous. In the sense of the invention, two optical elements are contiguous if there is a path linking the two optical elements along part of said path one may not measure the power based on a prescription for the eye of the wearer.

At least one activable optical element may have a spherical surfacic power.

At least one activable optical element may have an aspherical surfacic power.

Figure 2:
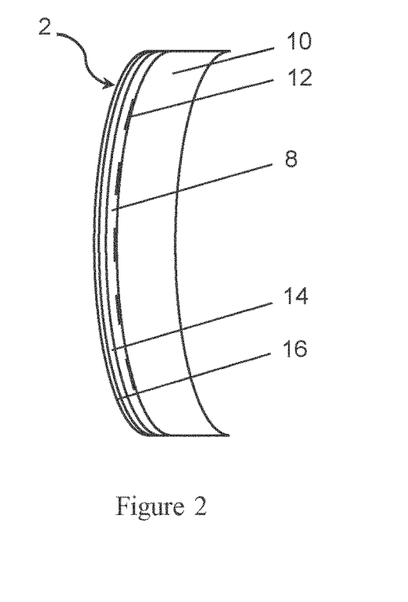

As illustrated in FIG. 2, the ophthalmic lens may comprise a substrate 10 having a first index of refraction. For example, the substrate 10 is made of polycarbonate.

The ophthalmic lens may further comprise at least one electrode 12. The at least one electrode 12 can be divided into a plurality of sub electrodes forming a plurality of pixels arranged preferentially in a matrix of line/column or in a concentric pattern and can be driven independently or by line/column or concentric electrode. The at least one electrode 12 is disposed on a face of the substrate 10. The at least one electrode is arranged on the face of the substrate so as to form a specific pattern. The at least one electrode 12 is preferentially disposed on a face of the substrate. For example, the at least one electrode may be disposed on a first surface of the substrate facing the eye of the wearer. Alternatively, the at least one electrode may be disposed on a second surface of the substrate opposed to the first surface. Preferentially, the ophthalmic lens comprises a plurality of electrodes 12 disposed on both first and second surfaces of the holder.

The at least one electrode 12 is made of an electrically conductive material having a level of transmission higher than 80%, preferably higher than 90%, and more preferably higher than 95%. For example, the electrically conductive material of the electrode corresponds to ITO (Indium Tin Oxide) and/or PEDOT (poly(3,4-ethylenedioxythiophene) polystyrene sulfonate) and/or ATO (Antimony Tin Oxide) and/or AZO (Aluminum Zinc Oxide).

According to an embodiment of the invention, the ophthalmic lens further comprises a thermo-optical material disposed on the at least one electrode 12.

The index of refraction of the thermo-optical material may varies with temperature. For example, the index of refraction of the thermo-optical element varies at a rate greater than or equal to $10^{-3}/°$ C. The thickness of the thermo-optical element may be greater than or equal to 5 µm and/or smaller than or equal to 500 µm.

The thermo-optical material forming the at least one activable optical element may vary between different states, preferentially two states, having different optical functions. For example, in a first state, the thermo-optical material has a first index of refraction equal to the index of refraction of the substrate for example at a temperature greater than or equal to 15° C. and smaller than or equal to 25° C. and contributes with the rest of the lens to the first optical function, and in a second state the thermo-optical material has a second optical function and at least a second index of refraction that differs the index of refraction of the substrates, for example at a temperature greater than or equal to 30° C. and smaller than or equal to 55° C.

The at least one electrode 12 may be made of an electrically resistive material which allows the electrode to generate heat when electric current passes through it.

For example, in a first state, a first intensity of current passes through the at least one electrode thereby generating a first amount of heat which brings the thermo-optical material to a first temperature. For said first temperature, the thermo-optical material has a first index of refraction, for example identical to the index of refraction of the holder. In this first state, the thermo-optical material has a first optical function and participates to the first optical function of the ophthalmic lens. In a second state, a second intensity of current passes through the at least one electrode thereby generating a second amount of heat which brings the thermo-optical element to a second temperature. The modification of the temperature will modify the index of refraction of the thermo-optical material and thereby will modify its optical function. In this second state, the thermo-optical material has a second optical function.

The second optical function of the activable optical element may depend on the temperature generated by the intensity of current passing through the at least one electrode possibly subdivided into a plurality of electrodes. A gradient of current may be obtained through a gradient of applied voltages generated thanks to the plurality of sub-electrodes constituting the at least one electrode so as to generate a gradient of temperature in order to provide a specific second optical function.

Additionally, the second optical function of the activable optical element may depend on the organization of the at least one electrode and the thermo-optical material. In other words, a specific pattern of electrodes disposed on the face of the substrate may correspond to a specific second optical function.

According to an embodiment, the at least one electrode 12 is organized on the face of the substrate 10 so that the second optical function of the at least one activable optical element is a spherical function.

Similarly, the at least one electrode 12 may be organized on the face of the substrate 10 so that the second optical function of the at least one activable optical element is an aspherical function.

The thermo-optical material may be covered by varnish element 14. The varnish element may provide a mechanical protection to the thermo-optical material. Additionally, the varnish element may play the role of a thermal buffer for the thermo-optical material. In other words, the varnish element isolates the thermo-optical material from part of the rest of the ophthalmic lens to protect it from the effect of the heat.

Additionally, the ophthalmic lens may comprise an anti-reflection coating element 16. The antireflection coating element is preferably disposed on the varnish element 14 so as to be at least partially isolated from the heat generated by the at least one electrode 12. Advantageously, the antireflection coating element allows suppressing, or at least reducing parasite effects resulting from the reflection of light on both surfaces of the ophthalmic lens.

The antireflection coating element is preferentially resistant to thermal expansion. For example, the antireflection coating element may be a sol-gel antireflective element. Alternatively, the antireflection coating element may be composed of low hybrid index multilayers.

According to another embodiment of the invention, the ophthalmic lens further comprises an electro-active element disposed on the at least one electrode 12.

The index of refraction of the electro-active element may varies depending on the electric field to which it is subject. In particular, the orientation of the elements forming the electro-active material changes upon application of the electric field and hence the refractive index seen by the light passing through the ophthalmic lens changes.

The electro-active element forming the at least one activable element may vary between different states, preferentially two states, having different optical functions. For example, in a first state, the electro-active element has a first index of refraction equal to the index of refraction of the substrate, and in a second state the electro-active element has a second optical function and at least a second index of refraction that differs the index of refraction of the substrates.

The at least one electrode 12 may be made of an electrically conductive material, divided into a plurality of electrodes, possibly arranged in a line column organization such a forming electrical pixels. The plurality of electrodes is connected to a power supply such as the applied voltage of each pixel can be controlled individually or by line and by column.

For example, in a first state, a first applied voltage passes through the all the pixels of the at least one electrode thereby generating a first electric field. For said current applied voltage, the electro-active element has a first index of refraction, for example identical to the index of refraction of the holder. In this first state, the electro-active element has a first optical function and participates to the first optical function of the ophthalmic lens.

In a second state, a plurality of applied voltages is applied to the plurality of pixels forming the at least one electrode thereby generating a second electric field distribution. The second electric field distribution will modify the index of refraction of the electro-active element and thereby will modify its optical function. In this second state, the at least one active optical element has a second optical function.

Additionally, the second optical function of the activable optical element may depend on the organization of the at least one electrode and the electro-active element. In other words, a specific pattern of electrodes disposed on the face of the substrate may correspond to a specific second optical function.

According to an embodiment, the at least one electrode 12 is organized on the face of the substrate 10 so that the second optical function of the at least one activable optical element is a spherical function.

Similarly, the at least one electrode 12 may be organized on the face of the substrate 10 so that the second optical function of the at least one activable optical element is an aspherical function According to an embodiment of the invention, the at least one activable optical element may comprise a matrix of electroactive cells. The matrix of electroactive cells is preferably disposed on a face of the holder. Each cell of the matrix of cells may be filled with an active electro-material such that the refraction index can vary in each pixel independently from each other.

Figure 3A:
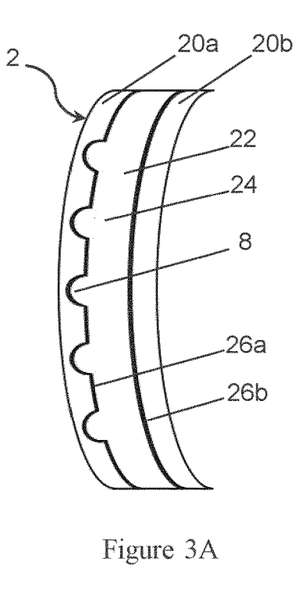

As illustrated in FIG. 3A, the ophthalmic lens 2 according to an embodiment of the invention may comprise a first substrate 20a and a second substrate 20b. The second substrate 20b is arranged to face the first substrate so as to form a cavity 22 between said two substrates. The first substrate 20a has a first index of refraction and the second substrate 20b has a second index of refraction that is identical to the first index of refraction.

The two substrates may be made of the same material, for example of polycarbonate.

The ophthalmic lens 2 may further comprise an electro-active material 24, disposed between the first and second substrates, and within the cavity 22.

The electro-active material 24 may vary between multiple states, preferentially two states, having different indices of refraction. For example, in a first state, the electro-active material 24 has a first index of refraction equal to the index of refraction of the substrates, and in a second state the electro-active material 24 has a second index of refraction that differs the index of refraction of the substrates.

The electro-active material 24 may be a liquid crystal, for example a cholesteric liquid crystalline material or a Blue Phase Liquid Crystal for polarization-independent materials.

The ophthalmic lens 2 may further comprise a first conductive layer 26a and a second conductive layer 26b. The first conductive layer 26a is disposed on the surface of the first substrate 20a facing the cavity 22 and the electro-active material 24. The second conductive layer 26b is disposed on the surface of the second substrate 20b facing the cavity 22 and the electro-active material 24.

The first and second conductive layer may be a transparent conductive ITO electrodes.

At least one of the surfaces of the substrates facing the cavity 22 comprises at least one structure forming the at least one activable optical element 8. The at least one activable optical element 8 may have a concave shape or a convex shape on the at least one surface of the substrates facing the electro-active material.

According to an embodiment of the invention, the at least one activable optical element, has discontinuities, such as a discontinuous surface, generating a converging (similar to the convex shape) or diverging (similar to the concave shape) phase profile. A discontinuous surface can be a Fresnel height lens profile, a binary lens profile, a π-Fresnel lens profile, a diffractive element, a metasurface.

In the first state, the substrates 20a, 20b and the electro-active material 24 have a similar index of refraction, which renders the at least one activable optical element 8 non-visible. The ophthalmic lens 2 in said first state has an index of refraction substantially constant over its thickness, thereby providing a constant optical power over its surface. Said optical power is based on the prescription of the wearer so as to correct the abnormal refraction of the eye of said wearer by focusing an image on the retina of the eye of the wearer.

Figure 3B:
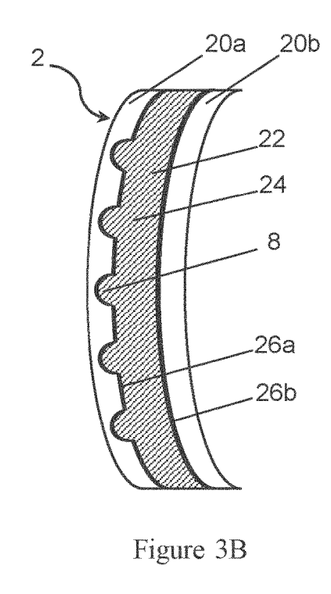

As illustrated on FIG. 3B, the ophthalmic lens 2 according to the invention may be in a second state that differs from the first state.

In the second state, a voltage is applied through the conductive layers 26a, 26b generating a local electric field that modify the index of refraction of the electro-active material 24 to a second index of refraction. Since the second index of refraction of the electro-active material in the second state differs from the index of refraction of the substrates, the at least one activable optical element 8 formed on at least one surface of the substrates facing the electro-active element 24 will be rendered optically active.

In this second state, the at least one activable optical element 8 has a second optical power that differs from the optical power of the ophthalmic lens, and has a second optical function of not focusing an image on the retina of the eye of the wearer. In a particular embodiment, the at least one activable optical element 8 has the second optical function of focusing an image other than on the retina of the eye of the wearer.

The orientation of the electro-active material changes upon application of the electric field and hence the refractive index seen by the light passing through the ophthalmic lens changes.

The at least one activable optical element 8 may have a concave shape on the at least one surface of the substrates. When the second index of refraction of the electro-active material 24 in the second state is higher than the first index of refraction of said electro-active material in the first state, the at least one activable optical element 8 has the optical function of focusing the light in front of the retina of the eye of the wearer. Alternatively, if the index of refraction in the second state is smaller than the index of refraction of the first state, the at least one activable optical element 8 has the optical function of focusing the light behind the retina of the eye of the wearer.

The at least one activable optical element 8 may have a convex shape on the at least one surface of the substrates. When the second index of refraction of the electro-active material 24 in the second state is higher than the first index of said electro-active material in the first state, the at least one activable optical element 8 has the optical function of focusing the light behind the retina of the eye of the wearer. Alternatively, if the index of refraction in the second state is smaller than the index of refraction of the electro-active material in the first state, the at least one activable optical element 8 has the optical function of focusing the light in front of the retina of the eye of the wearer.

Figure 4A:
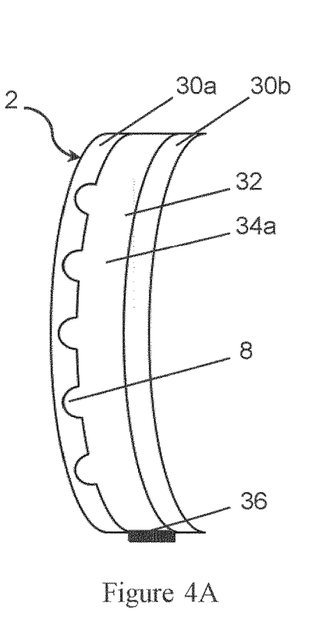

As illustrated in FIG. 4A, the ophthalmic lens 2 according to another embodiment of the invention may comprise a first substrate 30a and a second substrate 30b. The second substrate 30b is arranged to face the first substrate so as to form a cavity 32 between said two substrates. The first substrate 30a has a first index of refraction and the second substrate 30b has a second index of refraction that is identical to the first index of refraction.

At least one of the surfaces of the substrates facing the cavity 32 comprises at least one activable optical element 8, for example, a plurality of at least three optical elements 8.

The two substrates may be made of the same material, for example of polycarbonate.

The ophthalmic lens 2 may further comprise a first liquid 34a, disposed between the first and second substrates, and within the cavity 32. The first liquid 34a has a first index of refraction equal to the index of refraction of the first and second substrates.

The ophthalmic lens 2 may further comprise an activable pump 36. Preferably, the activable pump 36 is disposed between the two substrates.

In the first state, the substrates 30a, 30b and first liquid 34 have a similar index of refraction which renders the at least one activable optical element 8 non-visible. The ophthalmic lens 2 in said first state has an index of refraction substantially constant over its thickness, thereby providing a constant optical power over its surface. Said optical power is based on the prescription of the wearer so as to correct the abnormal refraction of the eye of said wearer by focusing an image on the retina of the eye of the wearer.

Figure 4B:
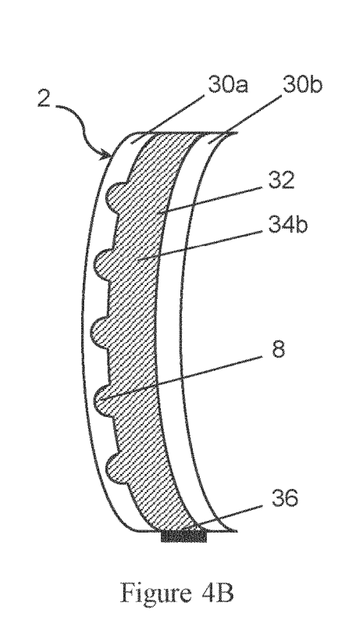

As illustrated on FIG. 4B, the ophthalmic lens 2 according to the invention may be in a second state that differs from the first state.

In the second state, the activable pump 36 is activated to replace the first liquid 34a by a second liquid 34b having a second index of refraction. Since the second index of refraction of the second liquid 34b differs from the index of refraction of the substrates, the at least one activable optical element 8 formed on at least one surface of the substrates facing the second liquid 34b will be rendered optically active.

In this second state, the at least one activable optical element 8 has a second optical power that differs from the optical power of the ophthalmic lens, and has a second optical function of not focusing an image on the retina of the eye of the wearer. In a particular embodiment, the at least one activable optical element 8 has the second optical function of focusing an image other than on the retina of the eye of the wearer The at least one activable optical element 8 may have a concave shape on the at least one surface of the substrates or may have discontinuities, such as a discontinuous surface, generating a converging (similar to the convex shape) or diverging (similar to the concave shape) phase profile. A discontinuous surface can be a Fresnel height lens profile, a binary lens profile, a π-Fresnel lens profile, a diffractive element, a metasurface.

When the index of refraction of the second liquid 34b is higher than the index of refraction of the first liquid 34a, the at least one activable optical element 8 has the optical function of focusing the light in front of the retina of the eye of the wearer. Alternatively, if the index of refraction of the second liquid 34b is smaller than the index of refraction of the first liquid 34a, the at least one activable optical element 8 has the optical function of focusing the light behind the retina of the eye of the wearer.

The at least one activable optical element 8 may have a convex shape on the at least one surface of the substrates. When the index of refraction of the second liquid 34b is higher than the index of refraction of the first liquid 34a, the at least one activable optical element 8 has the optical function of focusing the light behind the retina of the eye of the wearer. Alternatively, if the index of refraction of the second liquid 34b is smaller than the index of refraction of the first liquid 34a, the at least one activable optical element 8 has the optical function of focusing the light in front of the retina of the eye of the wearer.

Figure 5A:
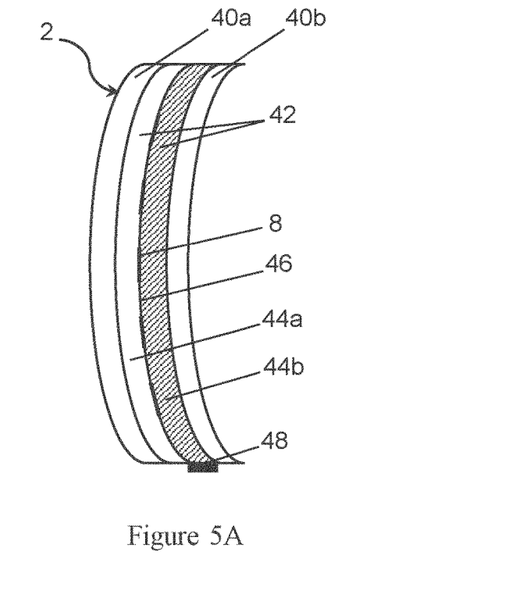

As illustrated in FIG. 5A, the ophthalmic lens 2 according to another embodiment of the invention may comprise a first substrate 40a and a second substrate 40b. The second substrate 40b is arranged to face the first substrate so as to form a cavity 42 between said two substrates. The first substrate 40a has a first index of refraction and the second substrate 40b has a second index of refraction. Preferably, the second index of refraction of the second substrate is identical to the first index of refraction.

The two substrates may be made of the same material, for example of polycarbonate.

The ophthalmic lens 2 may further comprise an ultrathin deformable membrane 46 disposed the first and second substrates 40a, 40b. The ultrathin deformable membrane 46 comprises at least one deformable zone corresponding to the at least one activable optical element 8.

The ophthalmic lens 2 may further comprise a first liquid 44a, disposed within the cavity 42 and between the first substrate 40a and the ultrathin membrane 46, and a second liquid 44b, disposed within the cavity 42 and between the second substrate 40b and the ultrathin membrane 46.

The index of refraction $n_1$ of the first liquid 44a preferably differs from the index of refraction $n_2$ of the second liquid 44b. Advantageously, the refraction index of the ultrathin deformable membrane is equal to $\sqrt{(n_1.n_2)}$ in order to minimize the reflection. Preferably, the index of refraction $n_1$ of the first liquid 44a is equal to the index of refraction of the first substrate 40a to avoid any refraction and reflection. When the index of refraction of the first and second substrates differs, the index of refraction $n_2$ of the second liquid 44b is preferably equal to the index of refraction of the second substrate 40b to avoid any refraction and reflection.

The ophthalmic lens 2 may further comprise an activable pump 48. Preferably, the activable pump 48 is disposed between a substrate and the ultrathin membrane 46 so as to contact only one of the first or second liquids.

In the first state, the surfaces of the substrates 40a, 40b and the ultrathin deformable membrane 46 have the same curvature corresponding to the basis curvature of the ophthalmic lens. The pressure of the first liquid 44a and the second liquid 44b is maintained identical so as to maintain the curvature of the ultrathin deformable membrane 46. The ophthalmic lens 2 in said first state has a constant surfacic optical power, thereby providing a constant optical power over its surface. Said optical power is based on the prescription of the wearer so as to correct the abnormal refraction of the eye of said wearer by focusing an image on the retina of the eye of the wearer.

Figure 5B:
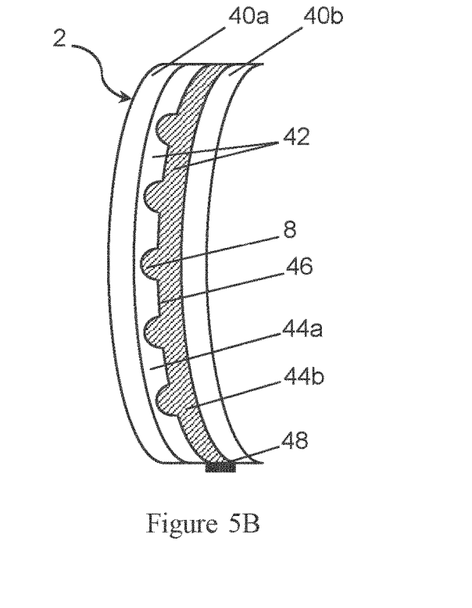

As illustrated on FIG. 5B, the ophthalmic lens 2 according to the invention may be in a second state that differs from the first state.

In the second state, the activable pump 46 is activated to modify the pressure of the second liquid 44b. The modification of the pressure of the second liquid 44b deforms the ultrathin deformable membrane 46 at the emplacement of the at least one activable optical element 8, thereby modifying the surfacic curvature of said activable optical element. Such modification of the curvature of the at least one activable optical element 8 renders it optically active.

In this second state, the at least one activable optical element 8 has a second optical power that differs from the optical power of the ophthalmic lens, and has a second optical function of not focusing an image on the retina of the eye of the wearer.

In a particular embodiment, the at least one activable optical element 8 has the second optical function of focusing an image other than on the retina of the eye of the wearer The relative deformation of the ultrathin deformable membrane from a first state in which the membrane is flat to a second state in which the ultrathin deformable membrane is curved is defined by the relation:

$$\frac{dL}{L} = \frac{\phi^2}{24R^2}$$

with $\phi$ the diameter of the optical element 8, R the radius of curvature of the optical element 8, L the length of the arc of circle of the lens element 8, and dL the lengthening of the arc of circle of the lens element 8.

According to another embodiment, the ophthalmic lens 2 further comprises a support on which the ultrathin deformable membrane 46 is disposed. The support comprises holes which define, with the ultrathin deformable membrane, the plurality of activable optical elements 8.

Preferably, the support is rigid. Advantageously, the support does deform when the pression of the second liquid varies. The support may be plano. Preferably, the support has a curvature identical to the curvature of the substrate, for example, the support is spherical.

Advantageously, the index of refraction of the support is equal to the index of refraction of the first liquid 44a to avoid any refraction and reflection.

Figure 6A:
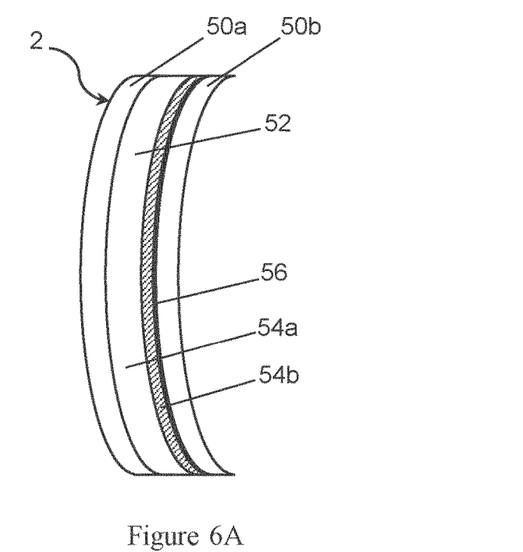

As illustrated in FIG. 6A, the ophthalmic lens 2 according to another embodiment of the invention may comprise a first substrate 50a and a second substrate 50b. The second substrate 50b is arranged to face the first substrate so as to form a cavity 52 between said two substrates. The first substrate 50a has a first index of refraction and the second substrate 50b has a second index of refraction that is identical to the first index of refraction.

The two substrates may be made of the same material, for example of polycarbonate.

The ophthalmic lens 2 may further comprise a first dielectric liquid 54a disposed within the cavity 52 and between the first and second substrates. The first dielectric liquid 54a has a first index of refraction.

The ophthalmic lens 2 may further comprise a second dielectric liquid 54b disposed within the cavity 52 and between the first and second substrates. The second dielectric liquid 54b is non-miscible with the first dielectric liquid 54a and has a second index of refraction that differs from the index of refraction of the first dielectric liquid 54b. The dielectric constant of the second dielectric liquid 54b is lower than the dielectric constant of the first dielectric liquid 54a.

The ophthalmic lens 2 may further comprise at least one conductive layer 56 disposed on the surface of at least one of the first and second substrates facing the cavity.

In the first state, the at least one conductive layer 56 subdivided in a plurality of electrodes generates an electric field that maintains the second liquid into a specific organization. In this first state, the second dielectric liquid is shaped by the electric field to form a single droplet having the same surfacic curvature than the front curvature of the ophthalmic lens 2. The first dielectric liquid 54*a* which has a higher dielectric constant than the second dielectric liquid 54*b* fills the rest of the cavity 52 and surrounds the second dielectric liquid 54*b*. The ophthalmic lens 2 in said first state has a constant surfacic optical power, thereby providing a constant optical power over its surface. Said optical power is based on the prescription of the wearer so as to correct the abnormal refraction of the eye of said wearer by focusing an image on the retina of the eye of the wearer.

Figure 6B:
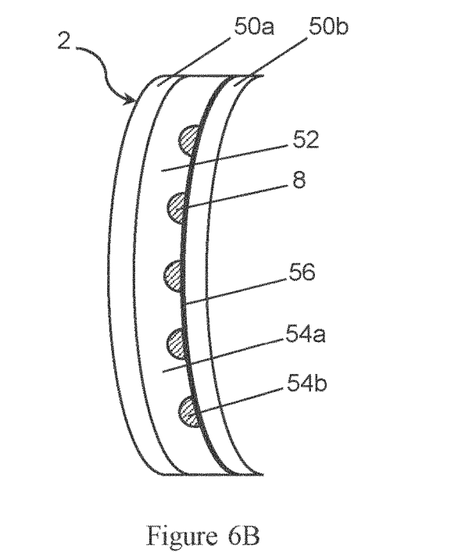

As illustrated on FIG. 6B, the ophthalmic lens 2 according to the invention may be in a second state that differs from the first state.

In the second state, the at least one conductive layer 56 divided into a plurality of electrodes generates an inhomogeneous horizontal electric field that forces the second dielectric liquid 54*b* which the lowest dielectric constant to shrink towards the regions having the weaker electric field. The second dielectric liquid 54*b* shaped by the inhomogeneous electric field forms the at least one activable optical element 8. Since the shape of the second dielectric liquid 54*b* is modified, the curvature of the surface of said liquid forming the at least one activable optical is also modified and differs from the surfacic curvature of the ophthalmic lens 2. Such modification of the curvature of the at least one activable optical element 8 renders it optically active.

In this second state, the at least one activable optical element 8 has a second optical power that differs from the optical power of the ophthalmic lens, and has a second optical function of not focusing an image on the retina of the eye of the wearer.

Figure 7:
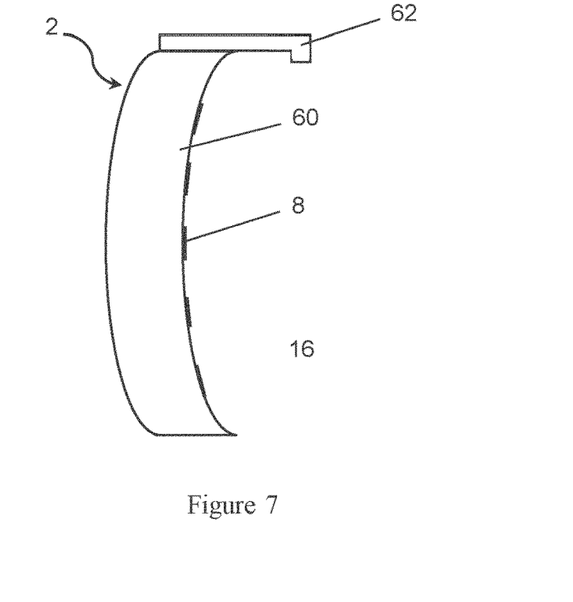
FIG. 7 illustrates an ophthalmic lens according to an embodiment of the invention.

In a particular embodiment, the at least one activable optical element 8 has the second optical function of focusing an image other than on the retina of the eye of the wearer According to another embodiment of the invention illustrated on FIG. 7, the ophthalmic lens may further comprise a substrate 60 having a first index of refraction.

The ophthalmic lens may further comprise at least one holographic optical element disposed on the face of the substrate facing the eye of the wearer. Preferably, the ophthalmic lens comprises a plurality of at least three holographic optical elements disposed on the face of the substrate facing the eye of the wearer.

In this particular embodiment, the at least one holographic optical element forms the at least one activable optical element 8 of the ophthalmic lens 2.

The ophthalmic lens may further comprise at least one activable image source 62. Alternatively, the activable image source may be embed in an eyewear equipment comprising the ophthalmic lens 2.

In a first state, the substrate and the at least one holographic optical element have the same index of refraction and participate to the first optical function of the ophthalmic lens. The ophthalmic lens in said first state has a constant surfacic optical power, thereby providing a constant optical power over its surface. Said optical power is based on the prescription of the wearer so as to correct the abnormal refraction of the eye of said wearer by focusing an image on the retina of the eye of the wearer.

In a second state, the at least one image source generates light that is reflected on the at least one holographic optical element toward the eye of the user thereby activating the second optical function of the at least one activable optical element. In this second state, the at least one activable optical element 8 formed by the at least one holographic optical element has a second optical function of not focusing an image on the retina of the eye of the wearer.

In a particular embodiment, the at least one activable optical element 8 has the second optical function of focusing an image other than on the retina of the eye of the wearer.

The ophthalmic lens 2 may comprise varnish element disposed on at least one of its surfaces. The varnish element may provide a mechanical protection to the surface of the ophthalmic lens it covers.

Additionally, the ophthalmic lens may comprise an antireflection coating element. The antireflection coating element is preferably disposed on at least one of the surfaces of the ophthalmic lens. Advantageously, the antireflection coating element allows suppressing, or at least reducing parasite effects resulting from the reflection of light on both surfaces of the ophthalmic lens.

The antireflection coating element is preferentially resistant to thermal expansion. For example, the antireflection coating element may be a sol-gel antireflective element. Alternatively, the antireflection coating element may be composed of low hybrid index multilayers.

According to an embodiment of the invention, the ophthalmic lens 2 further comprises receiving means configured to receive data.

The transition from a state of the ophthalmic lens 2 to another state may be driven in real-time by the received data.

The received data may relate to activity data. In the sense of the invention, the activity data may identify directly an activity carried out by the wearer of the ophthalmic lens or may be data allowing determining such activity, for example an indication allowing determining the activity of the wearer from a data base and/or lookup table. The activity data may be provided directly by the wearer itself, for example by selecting an activity in a list of activities.

For example, the ophthalmic lens may be in a first state with the activable optical elements contributing with the rest of the lens to the function of focusing an image on the retina of the eye of the wearer. When the ophthalmic lens receive activity data indicating that the wearer is reading a book, the ophthalmic lens may transition to a second state in which the activable optical elements have a the optical function of not focusing the light on the retina of the eye of the wearer so as to prevent or at least slow down the progression of an abnormal refraction of said eye.

Alternatively, the ophthalmic lens may be in a second state in which the activable optical elements have the optical function of not focusing the light on the retina of the eye of the wearer so as to prevent or at least slow down the progression of an abnormal refraction of said eye.

In a particular embodiment, the at least one activable optical element 8 has the second optical function of focusing an image other than on the retina of the eye of the wearer When the ophthalmic lens receives activity data indicating that the wearer is driving a car, the ophthalmic lens may transition to a first state with the activable optical elements contributing with the rest of the lens to the function of focusing an image on the retina of the eye of the wearer.

The received data may relate to a viewing distance. In the sense of the invention, the viewing distance corresponds to the distance between an eye of the wearer wearing an ophthalmic lens and the object seen by said wearer.

For example, the ophthalmic lens may be in a first state with the activable optical elements contributing with the rest of the lens to the function of focusing an image on the retina of the eye of the wearer while he is looking at a far vision distance. When the ophthalmic lens receive viewing distance data indicating that the wearer is looking at a near vision distance, the ophthalmic lens may transition to a second state in which the activable optical elements have a the optical function of not focusing the light on the retina of the eye of the wearer, in particular embodiment of focusing an image other than on the retina of the eye of the wearer, so as to prevent or at least slow down the progression of an abnormal refraction of said eye.

According to an embodiment of the invention, the ophthalmic lens 2 further comprises a distance sensor that measure viewing distance and transmit said measured viewing distance to the receiving means of the ophthalmic lens.

The received data may relate to a viewing angle. In the sense of the invention, the viewing angle corresponds to the angle between the direction between the eye of the wearer and the object seen by said wearer wearing an ophthalmic lens, and a horizontal direction passing through the geometrical center of the lens and the geometrical center of the eye of the wearer.

For example, the ophthalmic lens may be in a first state with the activable optical elements contributing with the rest of the lens to the function of focusing an image on the retina of the eye of the wearer while he is looking at the center of the lens. When the ophthalmic lens receive viewing angle data indicating that the wearer is looking at, for example the lower part of the ophthalmic lens, the ophthalmic lens may transition to a second state in which the activable optical elements have a the optical function of not focusing the light on the retina of the eye of the wearer, in particular embodiment of focusing an image other than on the retina of the eye of the wearer, so as to prevent or at least slow down the progression of an abnormal refraction of said eye.

Alternatively, the ophthalmic lens may be in a first state with the activable optical elements contributing with the rest of the lens to the function of focusing an image on the retina of the eye of the wearer while he is looking away from the center of the lens. When the ophthalmic lens receive viewing angle data indicating that the wearer is looking at the central zone of the ophthalmic lens, the ophthalmic lens may transition to a second state in which the activable optical elements have a the optical function of not focusing the light on the retina of the eye of the wearer, in particular embodiment of focusing an image other than on the retina of the eye of the wearer, so as to prevent or at least slow down the progression of an abnormal refraction of said eye.

According to an embodiment of the invention, the ophthalmic lens 2 further comprises an orientation sensor that measure viewing angle and transmit said measured viewing angle to the receiving means of the ophthalmic lens.

The received data may relate to a gaze direction. In the sense of the invention, the gaze direction corresponds to the position of the optical axis of the eye. The optical axis of the eye corresponds to the axis passing through the center of rotation of the eye and the center of the pupil of said eye.

According to an embodiment of the invention, the activable optical elements comprised within the visual zone are in a first state and contributes with the rest of the lens to the first optical function of the ophthalmic lens. The activable optical elements outside of the visual zone are in second state and have a second optical function.

Alternatively, the activable optical elements comprised within the visual zone may be in a second state and have a second optical function. The activable optical elements outside of the visual zone are in a first state and contributes with the rest of the lens to the first optical function of the ophthalmic lens.

The visual correspond to a circular zone whose center is defined by the intersection between the actual gaze direction of the eye of the wearer and a face of the ophthalmic, for example the face of the ophthalmic lens facing the eye of the wearer. The visual zone may have a diameter comprised between 5 mm and 20 mm, preferably between 5 mm and 15 mm, more preferably between 5 mm and 10 mm.

According to an embodiment of the invention, the ophthalmic lens 2 further comprises a gaze direction sensor that determine the gaze direction and transmit said gaze direction to the receiving means of the ophthalmic lens.

Advantageously, the determined gaze direction is transmitted to the receiving means in real-time so as to immediately adapt the state of the activable optical elements according to the actual gaze direction of the eye of the wearer.

The received data may relate to environment data. In the sense of the invention, the environment data relates to any parameter of the environment of the wearer that may have an impact on the vision of said wearer. For example, the environment data may relate to spectral features and intensity of the light received by the wearer. Furthermore, the environment data may relate to temperature and/or humidity of the environment of the wearer, the amount and/or the type of allergens and/or pollutants contained in the environment of the wearer and/or an indication of the localization of the wearer such as indoor or outdoor, etc. . . . . .

For example, the ophthalmic lens may be in a first state with the activable optical elements contributing with the rest of the lens to the function of focusing an image on the retina of the eye of the wearer when the intensity of the light received by the wearer is too important. When the ophthalmic lens receive environment data indicating that the intensity of the light is lower than a pre-defined threshold, the ophthalmic lens may transition to a second state in which the activable optical elements have a the optical function of not focusing the light on the retina of the eye of the wearer, in particular embodiment of focusing an image other than on the retina of the eye of the wearer, so as to prevent or at least slow down the progression of an abnormal refraction of said eye.

According to an embodiment of the invention, the ophthalmic lens 2 further comprises an environment sensor configured to measure environment data and transmit said measured environment data to the receiving means of the ophthalmic lens.

The invention claimed is:

1. An ophthalmic lens intended to be worn in front of an eye of a wearer having a first optical function based on a prescription of the wearer for correcting an abnormal refraction of said eye of the wearer, the ophthalmic lens comprising:
at least one activable optical element,
wherein in a first state the at least one activable optical element contributes with the rest of the ophthalmic lens to focus an image of an object at distance on a retina, and in a second state the at least one activable optical element has a second optical function of not focusing an image on the retina of the eye of the wearer so as to slow down progression of the abnormal refraction of the eye, and
wherein transitions between the first and second states of the ophthalmic lens are driven in real-time based on received data, the received data relating to a viewing distance or to a viewing angle.

2. The ophthalmic lens according to claim 1, wherein in the second state the at least one activable optical element has a second optical function of focusing an image other than on the retina of the eye of the wearer.

3. The ophthalmic lens according to claim 1, wherein the at least one activable optical element has a spherical surfacic power.

4. The ophthalmic lens according to claim 1, wherein the at least one activable optical element has an aspherical surfacic power.

5. The ophthalmic lens according to claim 1, wherein the at least one activable optical element comprises a thermo-optical material whose index of refraction varies with temperature at a rate greater than or equal to $10^{-3}/°$ C.

6. The ophthalmic lens of claim 5, further comprising at least one electrode arranged so as to modify the temperature of the thermo-optical material, the at least one electrode being made of an electrically conductive material having a level of transmission higher than 80%.

7. The ophthalmic lens according to claim 1, further comprising:
a first substrate having a first index of refraction;
a second substrate having said first index of refraction, the second substrate being arranged to face the first substrate and form a cavity between said first and second substrates;
an electro-active material disposed between the first and second substrates, the electro-active material having an index of refraction equal to the index of refraction of the substrates in a first state;
a first conductive layer disposed on a surface of the first substrate facing the electro-active material; and
a second conductive layer disposed on a surface of the second substrate facing the electro-active material,
wherein at least one of the surfaces of the substrate facing the electro-active material comprises at least one activable optical element, and
wherein in a first state, the first and second substrates, the electro-active material and the at least one activable optical element have the same index of refraction and participate to the first optical function, and in a second state, the index of refraction of the electro-active material is modified, thereby activating the second optical function of the at least one activable optical element.

8. The ophthalmic lens according to claim 1, further comprising:
a first substrate having a first index of refraction;
a second substrate having said first index of refraction, the second substrate being arranged to face the first substrate and form a cavity between said first and second substrates;
a first liquid disposed between the first and second substrate, the first liquid having a first index of refraction equal to the index of refraction of the first and second substrates; and
an activable pump disposed between the two substrates,
wherein at least one of the surfaces of the substrate facing the first liquid comprises at least one activable optical element,
wherein in a first state, the first and second substrates, the first liquid and the at least one activable optical element have the same index of refraction and participate to the first optical function, and in a second state, the activable pump switches the first liquid to a second liquid having a second index of refraction that differs from the index of refraction of the first and second substrates, thereby activating the second optical function of the at least one activable optical element.

9. The ophthalmic lens according to claim 1, further comprising:
a first substrate having a first index of refraction;
a second substrate having said first index of refraction, the second substrate being arranged to face the first substrate and form a cavity between said first and second substrates;
an ultrathin deformable membrane disposed between the first and second substrates and comprising at least one activable optical element;
a first liquid disposed between the first substrate and the ultrathin deformable membrane, the first liquid having a first index of refraction;
a second liquid disposed between the second substrate and the ultrathin deformable membrane, the second liquid having a second index of refraction different from the first index of refraction; and
an activable pump disposed between the first and second substrates;
wherein in a first state the at least one activable optical element has the same curvature of a front side of the ophthalmic lens, and
wherein in a second state the activable pump modifies pressure of the second liquid to deform the ultrathin membrane and modify the curvature of the at least one activable optical element, thereby activating the second optical function of said activable optical element.

10. The ophthalmic lens according to claim 1, further comprising:
a first substrate having a first index of refraction;
a second substrate having said first index of refraction, the second substrate being arranged to face the first substrate and form a cavity between said first and second substrates;
a first dielectric liquid disposed between the first and the second substrates, the first liquid having a first index of refraction;
a second dielectric liquid, non-miscible with the first dielectric liquid, disposed between the first and the second substrates, the second liquid having a second refractive index of refraction different from a first refractive index and a dielectric constant lower than the dielectrics constant of the first liquid; and
at least one conductive layer disposed on the surface of at least one of the first and second substrates facing the second dielectric liquid forming a droplet, the first dielectric forming a surrounding,
wherein in a first state the at least one conductive layer generates an electric field that shapes the second dielectric liquid into a droplet having the same curvature as a front surface of a front side of the ophthalmic lens, and in a second state the at least one conductive layer creates an inhomogeneous electric field generating a dielectric force forcing the second dielectric liquid that shrinks towards a region having a weaker electric field to form the at least one activable optical element having a surfacic curvature that differs from the surfacic curvature of the ophthalmic lens.

11. The ophthalmic lens according to claim 1, further comprising:
a substrate having a first index of refraction;
at least one holographic optical element disposed on a face of the substrate facing the wearer; and
at least one activable image source, wherein in a first state, the substrate and the at least one holographic optical element have the same index of refraction and participate to the first optical function, and in a second state, the at least one image source generates light that is reflected on the at least one holographic optical element toward the eye of the wearer thereby activating the second optical function of the at least one activable optical element.

12. The ophthalmic lens according to claim 1, wherein an abnormal refraction of the eye of the wearer corresponds to myopia and wherein the at least one activable optical element does not focus light rays on the retina of the wearer.

13. The ophthalmic lens according to claim 1, wherein the abnormal refraction of the eye of the wearer corresponds to myopia and wherein the at least one activable optical element focuses light rays in front of the retina of the wearer.

14. The ophthalmic lens according to claim 1, further comprising a receiver configured to receive data, and wherein transitions between the first and second states of the ophthalmic lens are driven in real-time based on the received data.

15. The ophthalmic lens according to claim 14, wherein the received data relates to a viewing distance or to a viewing angle.

16. An ophthalmic lens intended to be worn in front of an eye of a wearer having a first optical function based on a prescription of the wearer for correcting an abnormal refraction of said eye of the wearer, the ophthalmic lens comprising:
    at least one activable optical element,
    wherein in a first state the at least one activable optical element contributes with the rest of the ophthalmic lens to focus an image of an object at distance on a retina, and in a second state the at least one activable optical element has a second optical function of not focusing an image on the retina of the eye of the wearer so as to slow down progression of the abnormal refraction of the eye,
    wherein the ophthalmic lens further comprises:
        a first substrate having a first index of refraction,
        a second substrate having said first index of refraction, the second substrate being arranged to face the first substrate and form a cavity between said first and second substrates,
        an ultrathin deformable membrane disposed between the first and second substrates and comprising at least one activable optical element,
        a first liquid disposed between the first substrate and the ultrathin deformable membrane, the first liquid having a first index of refraction,
        a second liquid disposed between the second substrate and the ultrathin deformable membrane, the second liquid having a second index of refraction different from the first index of refraction, and
        an activable pump disposed between the first and second substrates,
    wherein in a first state the at least one activable optical element has the same curvature of a front side of the ophthalmic lens, and
    wherein in a second state the activable pump modifies pressure of the second liquid to deform the ultrathin membrane and modify the curvature of the at least one activable optical element, thereby activating the second optical function of said activable optical element.

17. An ophthalmic lens intended to be worn in front of an eye of a wearer having a first optical function based on a prescription of the wearer for correcting an abnormal refraction of said eye of the wearer, the ophthalmic lens comprising:
    at least one activable optical element,
    wherein in a first state the at least one activable optical element contributes with the rest of the ophthalmic lens to focus an image of an object at distance on a retina, and in a second state the at least one activable optical element has a second optical function of not focusing an image on the retina of the eye of the wearer so as to slow down progression of the abnormal refraction of the eye,
    wherein the ophthalmic lens further comprises:
        a first substrate having a first index of refraction,
        a second substrate having said first index of refraction, the second substrate being arranged to face the first substrate and form a cavity between said first and second substrates,
        a first dielectric liquid disposed between the first and the second substrates, the first liquid having a first index of refraction,
        a second dielectric liquid, non-miscible with the first dielectric liquid, disposed between the first and the second substrates, the second liquid having a second refractive index of refraction different from a first refractive index and a dielectric constant lower than the dielectrics constant of the first liquid, and
        at least one conductive layer disposed on the surface of at least one of the first and second substrates facing the second dielectric liquid forming a droplet, the first dielectric forming a surrounding,
    wherein in a first state the at least one conductive layer generates an electric field that shapes the second dielectric liquid into a droplet having the same curvature as a front surface of a front side of the ophthalmic lens, and in a second state the at least one conductive layer creates an inhomogeneous electric field generating a dielectric force forcing the second dielectric liquid that shrinks towards a region having a weaker electric field to form the at least one activable optical element having a surfacic curvature that differs from the surfacic curvature of the ophthalmic lens.

* * * * *